US006415523B1

(12) United States Patent
Wood

(10) Patent No.: US 6,415,523 B1
(45) Date of Patent: Jul. 9, 2002

(54) DIGITAL KEY DECODER

(76) Inventor: Clifford Eugene Wood, P.O. Box 9402, Silver Spring, MD (US) 20916

( * ) Notice: Subject to any disclaimer, the term of this patent is extended or adjusted under 35 U.S.C. 154(b) by 0 days.

(21) Appl. No.: 09/455,656

(22) Filed: Dec. 7, 1999

(51) Int. Cl.[7] .............................. G01B 3/28; G01B 5/20

(52) U.S. Cl. .............................. 33/539; 33/552; 70/460

(58) Field of Search .......................... 33/539, 540, 549, 33/551, 552, 553, 554, 555, 1 L; 70/460

(56) References Cited

U.S. PATENT DOCUMENTS

| | | | | | |
|---|---|---|---|---|---|
| 2,070,228 | A | * | 2/1937 | Fitz Gerald | 33/539 |
| 3,172,969 | A | * | 3/1965 | Haggstrom | 33/539 |
| 3,264,742 | A | * | 8/1966 | Roland | 33/539 |
| 3,775,855 | A | * | 12/1973 | Marmel | 33/539 |
| 4,090,303 | A | * | 5/1978 | Uyeda | 33/539 |
| 4,283,859 | A | * | 8/1981 | Roland | 33/539 |
| 4,551,921 | A | * | 11/1985 | Puyo et al. | 33/366.14 |
| 4,932,132 | A | * | 6/1990 | Baker et al. | 33/366.18 |

* cited by examiner

*Primary Examiner*—Christopher W. Fulton

(57) ABSTRACT

A precision electronic apparatus and method for decodes a lock key, wherein the coded key is inserted into the warded keyway. Simultaneously, this engages a toggle switch and rod. The rod engages a spring-loaded linear switch for each groove. The spring-loaded switch selects only one linear trace on the circuit board. Each circuit board converts the selected linear trace into a binary code. The toggle switch conducts the electronic circuitry and the binary codes are decoded for each notch in the shank of the key. The combined digits result as the complete key code on the LED segment display on the front faceplate.

4 Claims, 18 Drawing Sheets

Vector Board – Figure 1

Faceplate – Figure 2

Plexiglas

Case Assembly – Figure 3
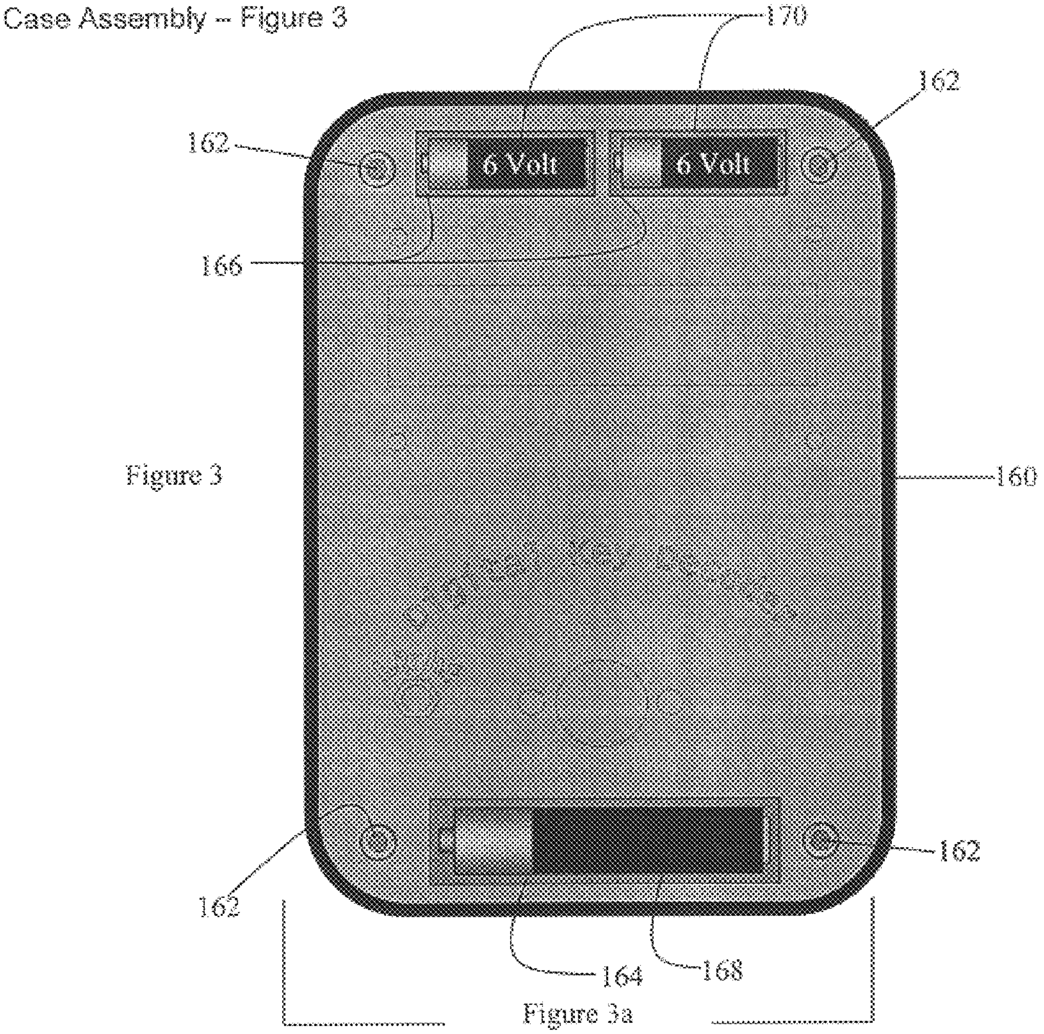
Figure 3
Figure 3a
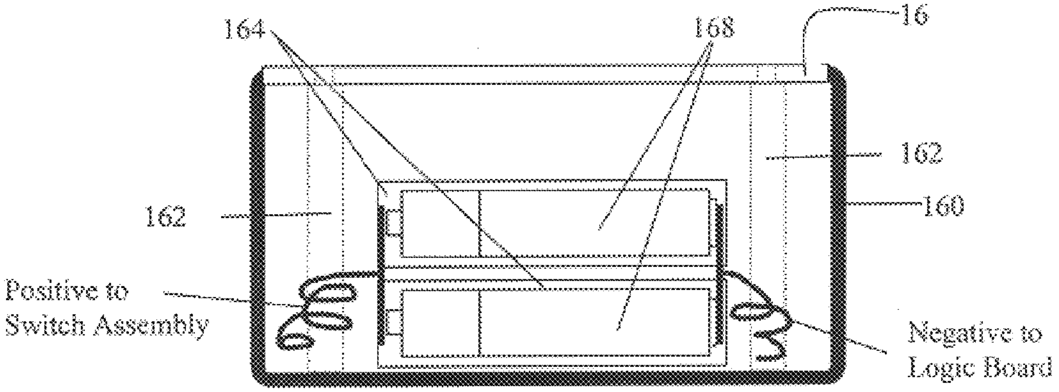
Figure 3a
Bottom view Display Module – Figure 4
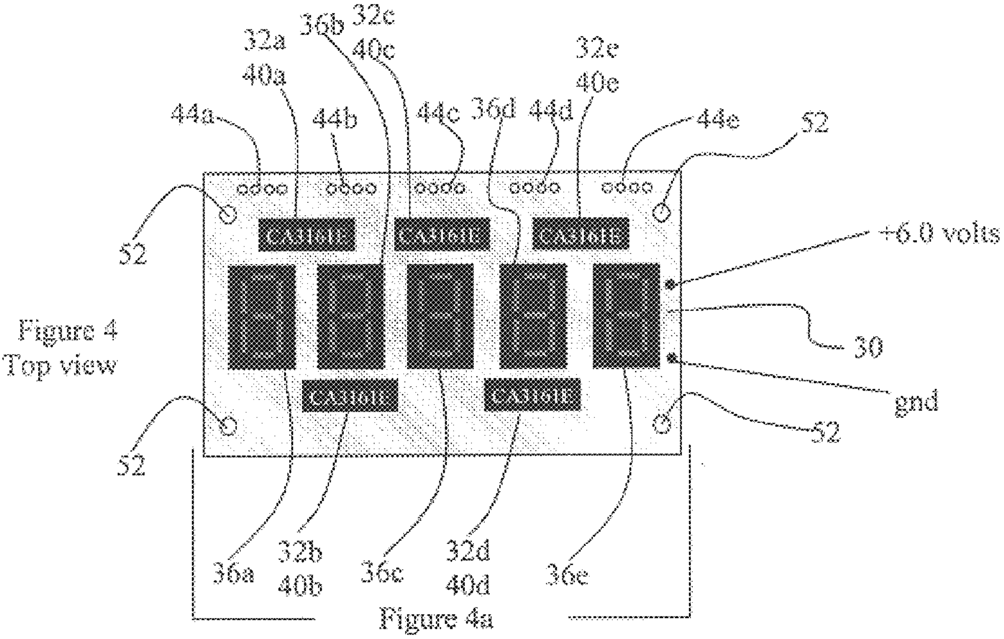
Figure 4
Top view
Figure 4a
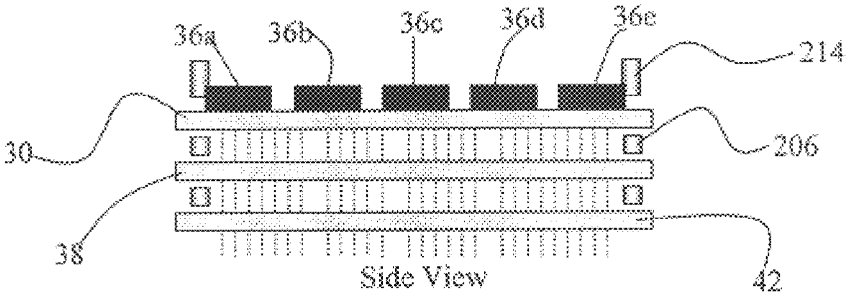
Side View
Figure 4a Logic Board – Figure 5
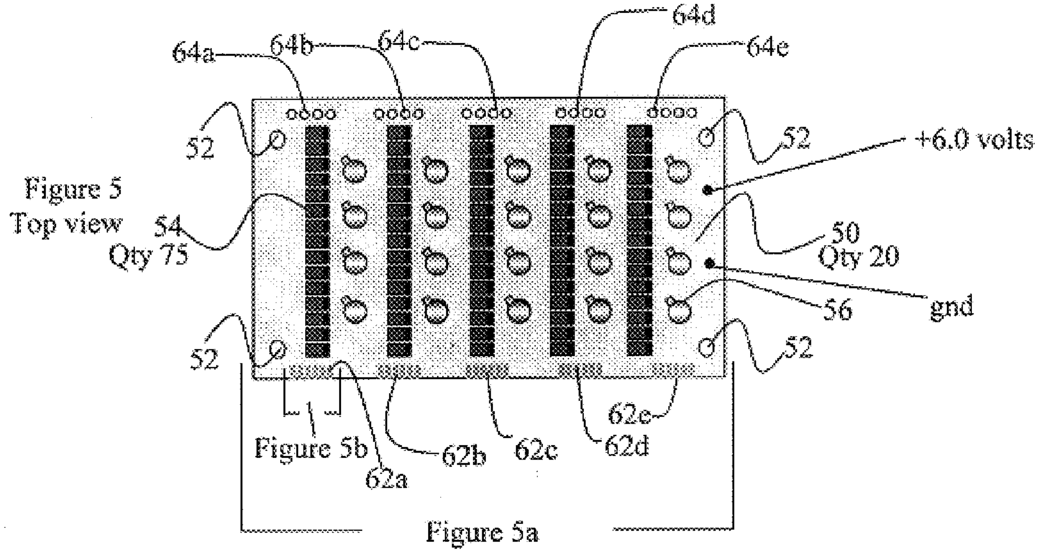
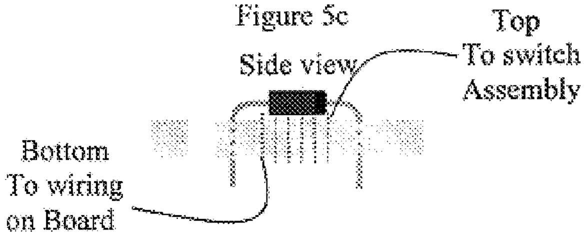
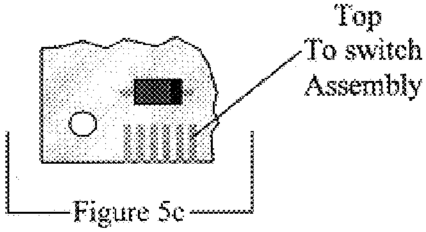
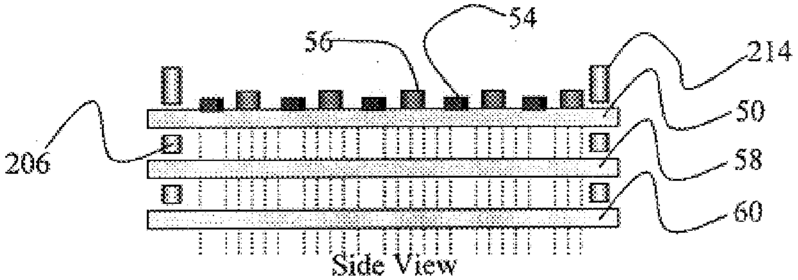
Side View
Figure 5a Switch Assembly – Figure 6
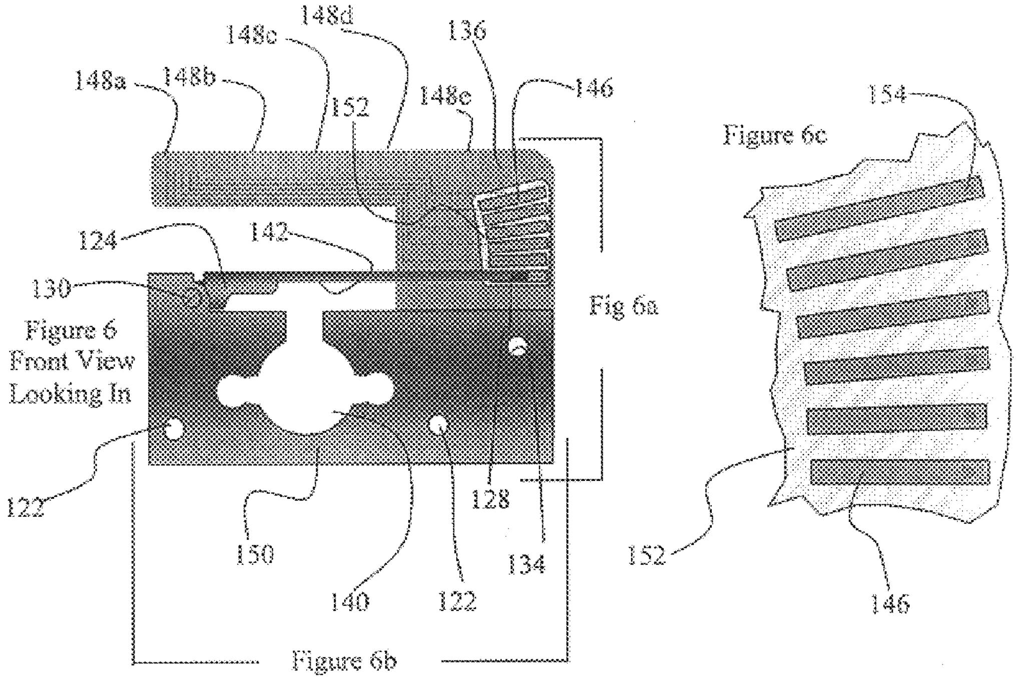
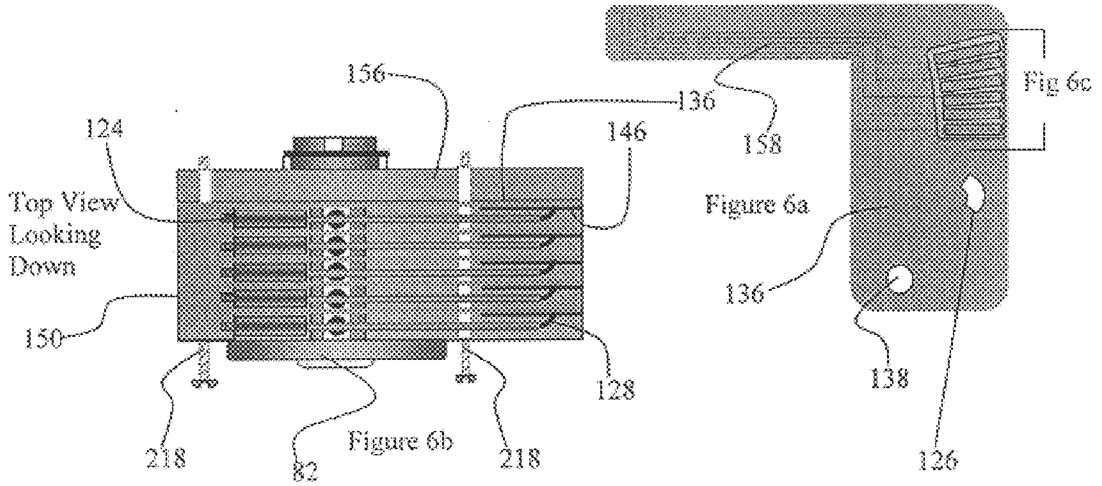

Cylinder Assembly – Figure 7
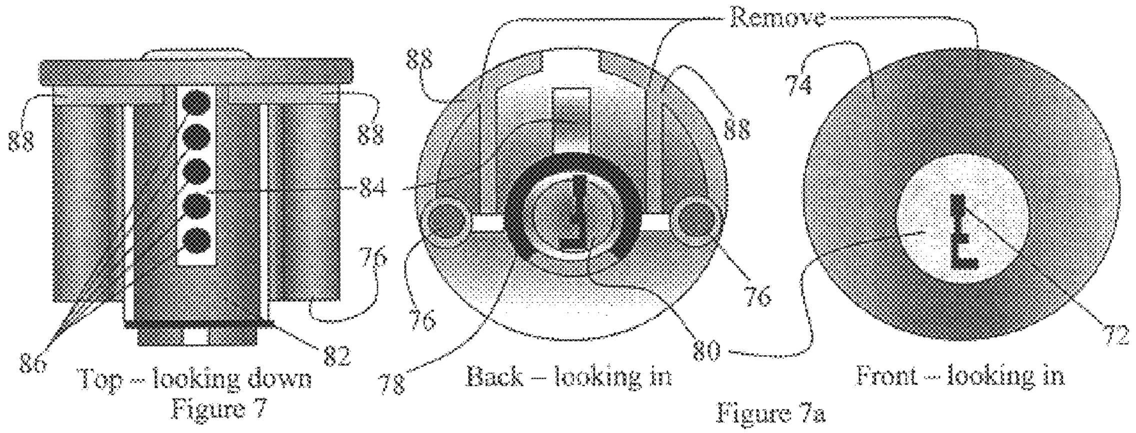
Top – looking down
Figure 7
Back – looking in
Front – looking in
Figure 7a
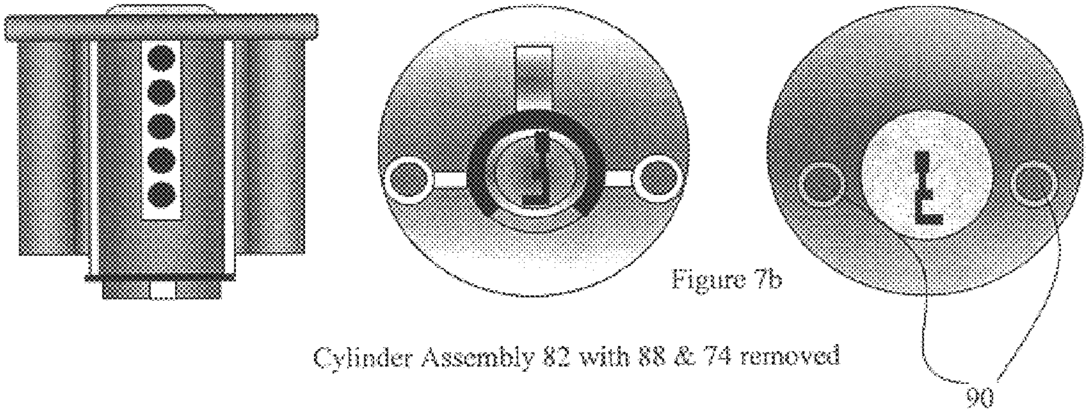
Figure 7b
Cylinder Assembly 82 with 88 & 74 removed
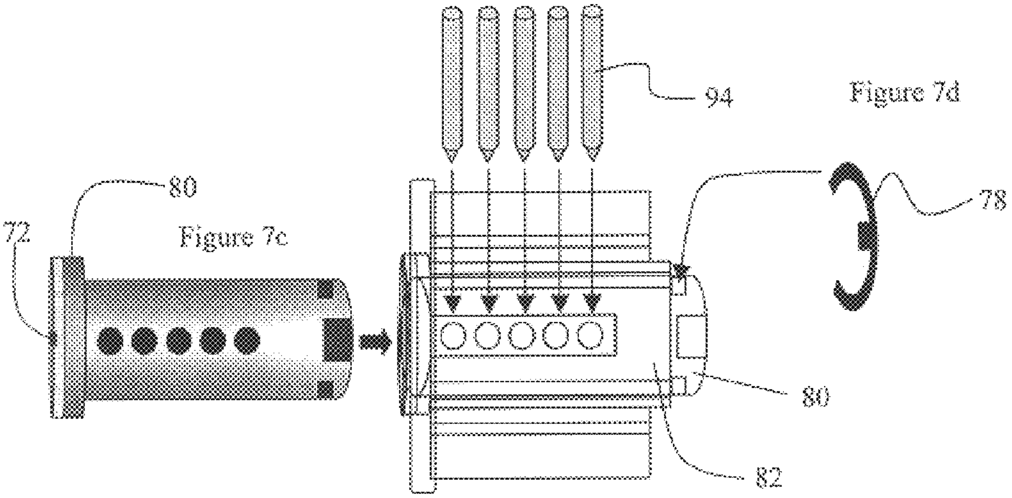

Toggle Switch and Light Assembly – Figure 8, 9, 10
Toggle Switch Assembly
Figure 8
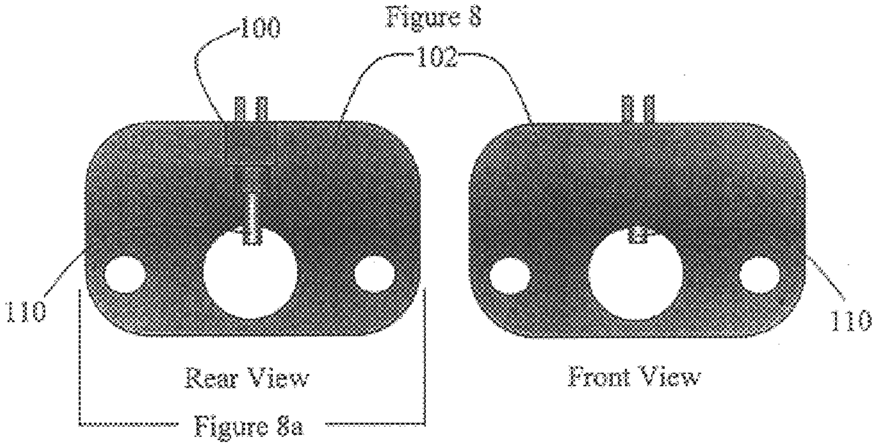
Figure 8a
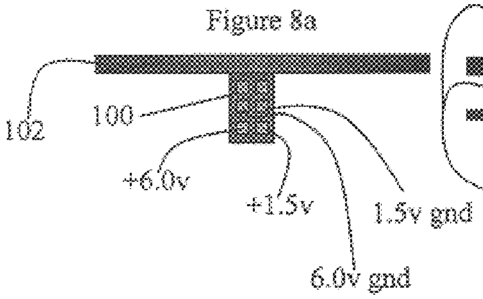
Figure 8a
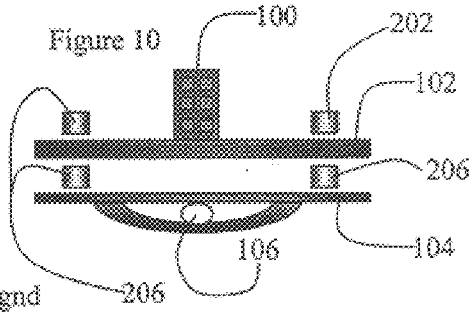
Figure 10
Light Assembly
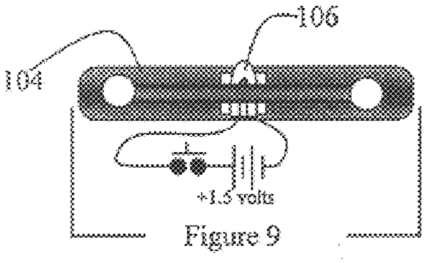
Figure 9
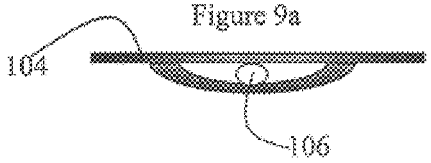
Figure 9a Switch Arm Assembly – Figure 11, 12
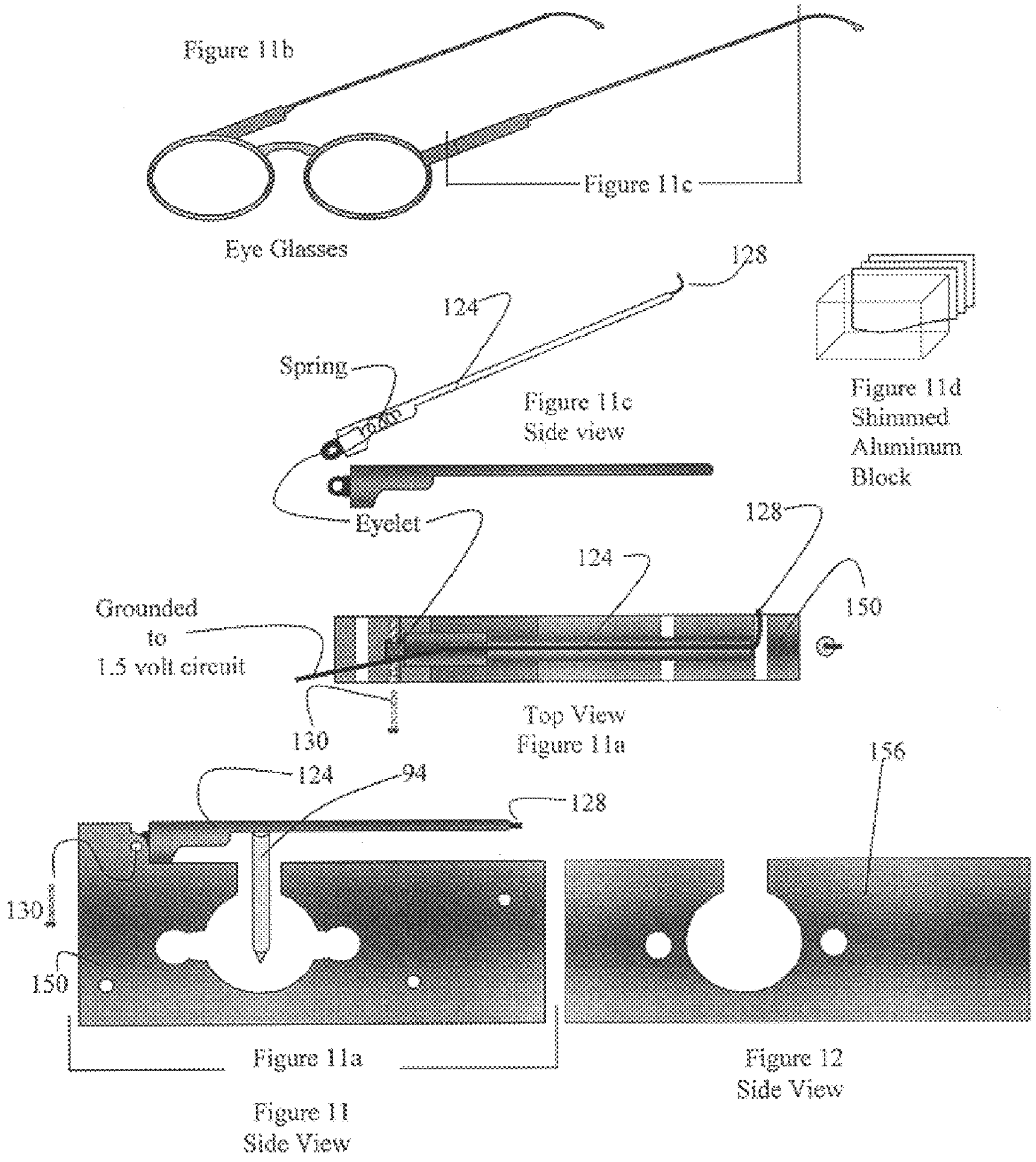

Switch Arm Positions – Figure 13

Complete Unit – Figure 14
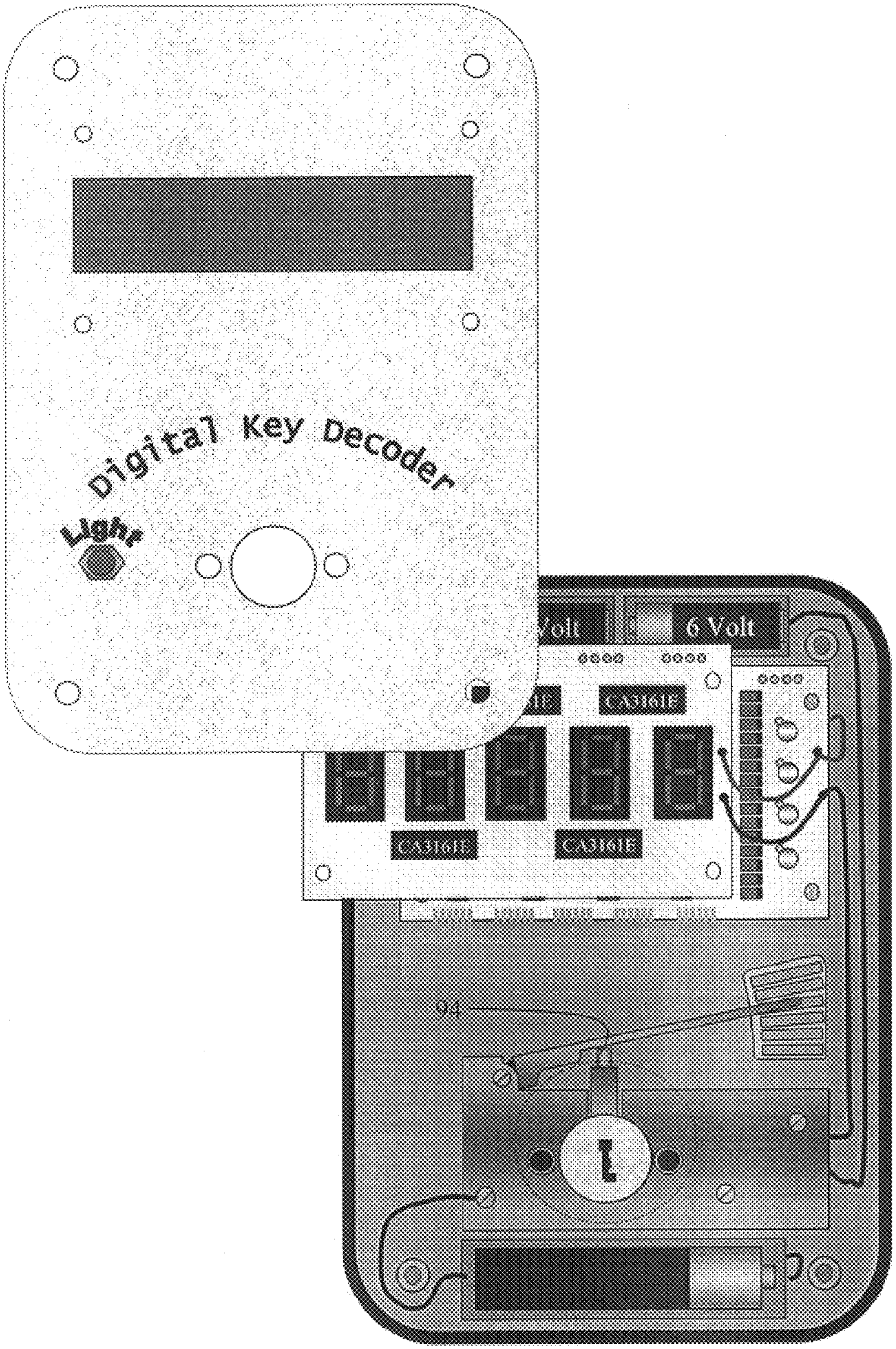

Complete Unit – Figure 14a
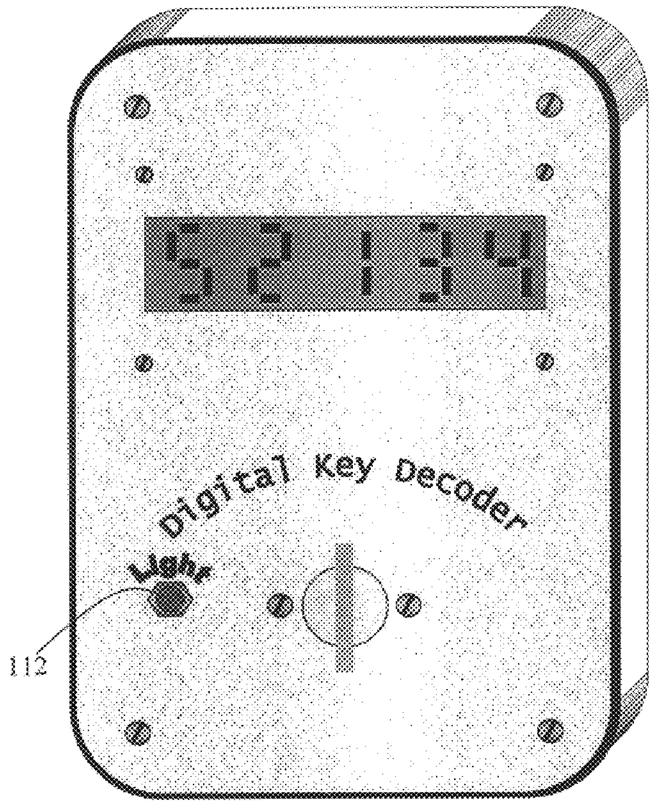
Front View
This 3-D Front view shows the complete unit with the aluminum faceplate resting in an all aluminum case enclosure. A pre-coded key of 5-2-1-3-4 was inserted into the keyway, which flips a toggle switch and illuminates the code of this key in the LED display window.
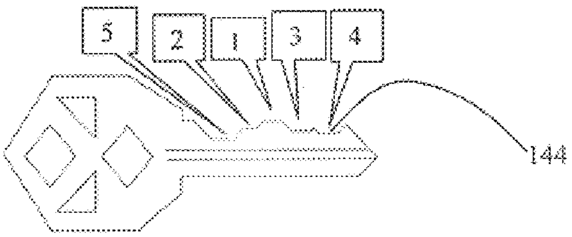
Pre-coded key Block Diagram Schematic – Figure 15

1. Circuit A – Two parallel 1.5-volt AA batteries supply power only to the Switch Assembly.
2. Switch Assembly - Mechanically selects the depth of the shank in a key for each notch or groove (five in this case). This information is relayed to the Logic Board.
3. Logic Board – Receives input from the Switch Assembly. Converts a mechanical signal into binary logic (8-bit truth table) determined on the position received from the Switch Assembly.
4. Display Module - Converts the information from the Logic Board into a BCD digital number on each of the five LED segment displays. Each LED segment make up the complete code for the key when read left to right across the display.
5. CIRCUITS B – Two parallel 6.0-volt batteries supply power to the Integrated Circuit chips and LED segments on the Display Module.
6. Momentary DPDT[13] Toggle Switch – Closes contacts on circuits A and B simultaneously after a coded key[14] is inserted. Both circuits open after key is released. Preserves battery life and circuitry.
7. Push-Button Switch activates the light for the keyway for night viewing.

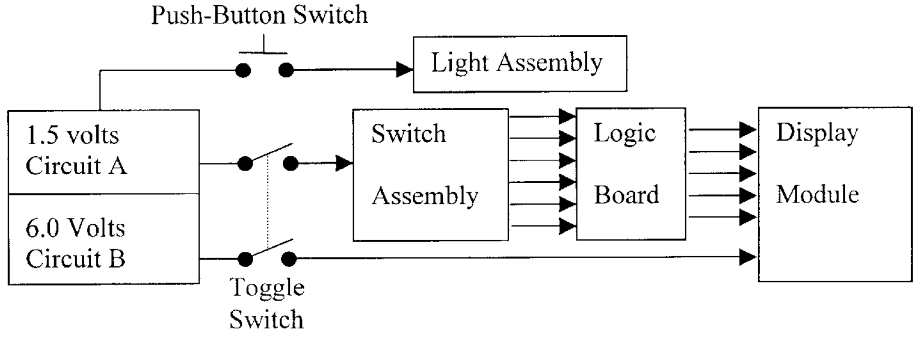

[13] Momentary DPDT – Double Pole Double Throw toggle switch. Closes contacts on two separate circuits at the same time after the key is inserted and held. Both circuits open when key is released.
[14] Coded key – keys that are not blank. Hence, keys that have cuts in the shank, notch or grooves.

Display Module schematic - Board 1 – Wiring – Figure 16a
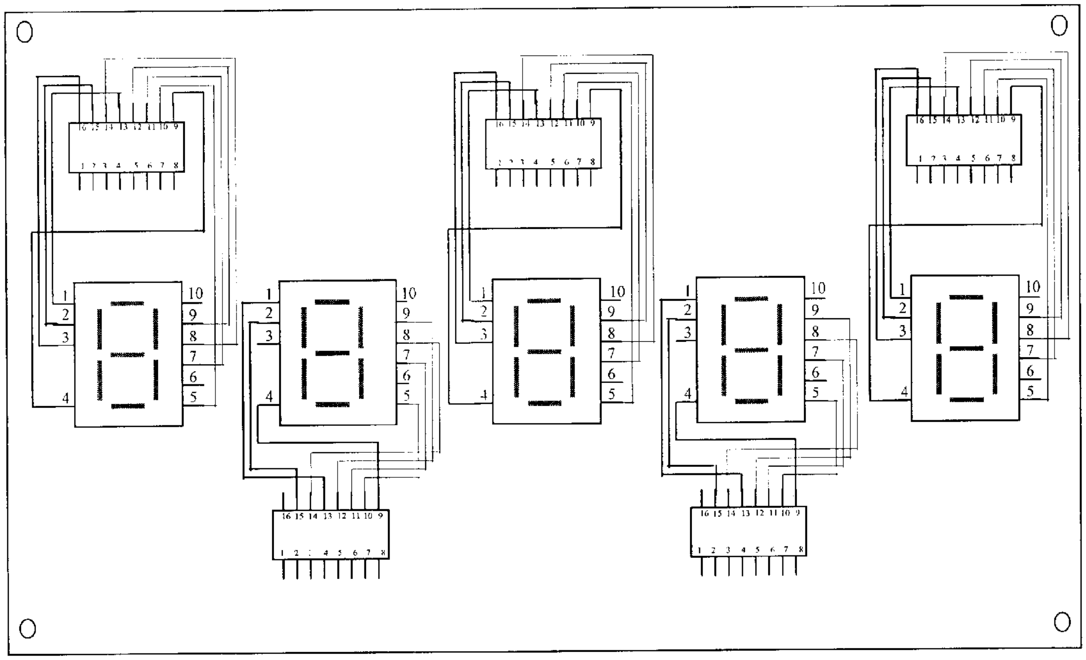
Display Module schematic – Board 2 – Wiring – Figure 16b
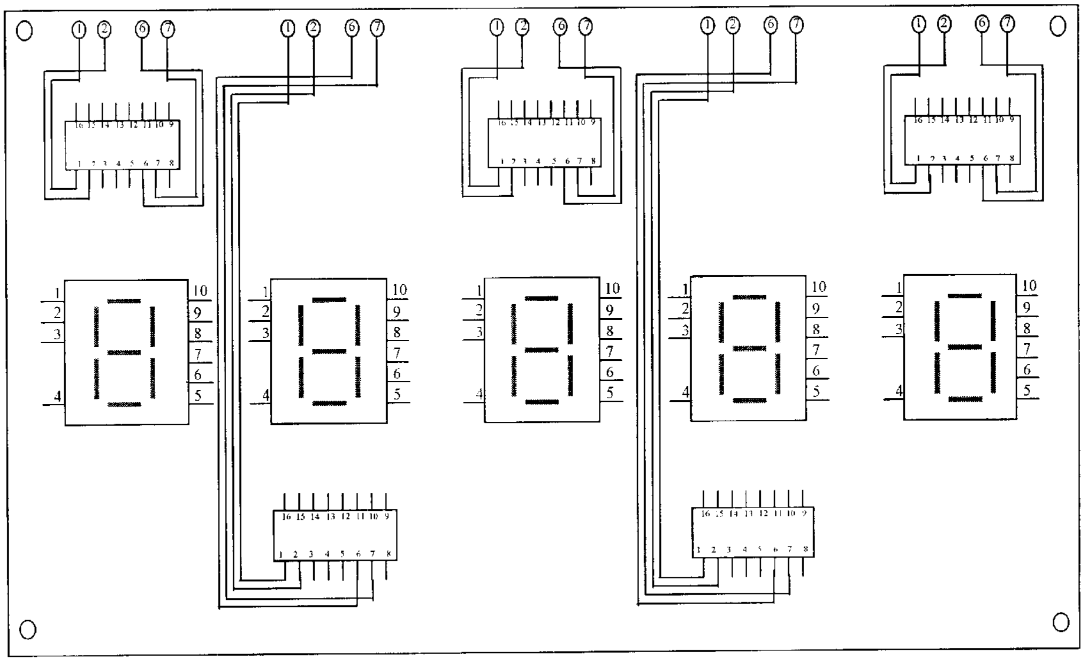

Display Module schematic - Board 3 – Power – Figure 16c
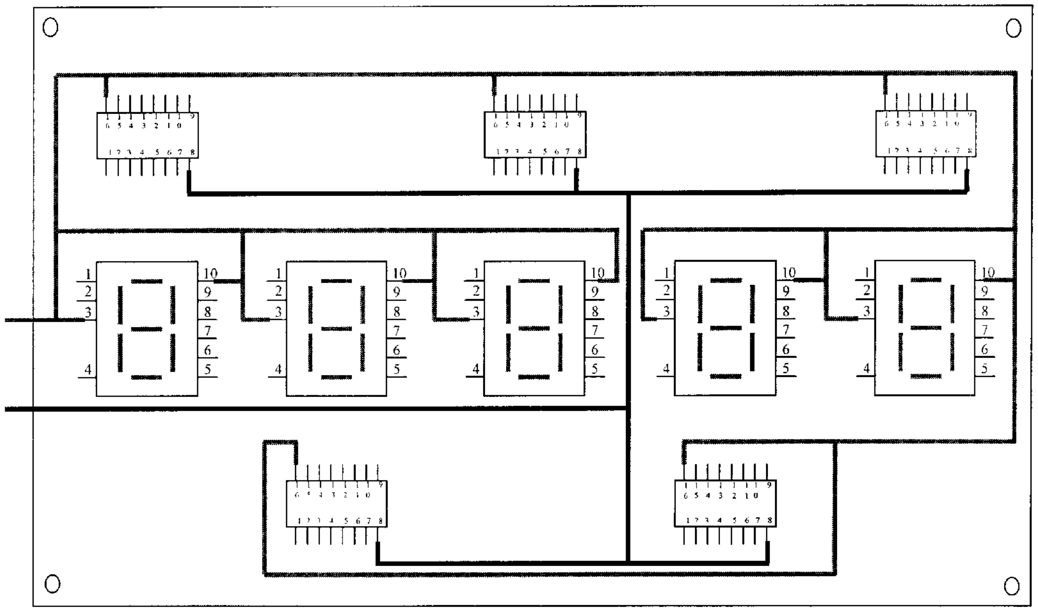

Logic Board Schematic – Figure 17

1. There are a total of five identical circuits on this Logic Board, one from each Switch Assembly edge connector.
2. The six inputs on the left is the Logic Board edge connector (62), which receive the signal from each Switch Assembly edge connector (148).
3. The signal received from the Switch Assembly edges connector (148), will forward bias the diodes and conduct the transistor to ground. This will set the binary code out of the Logic Board to a low (64) which drive the input to the Display Module.

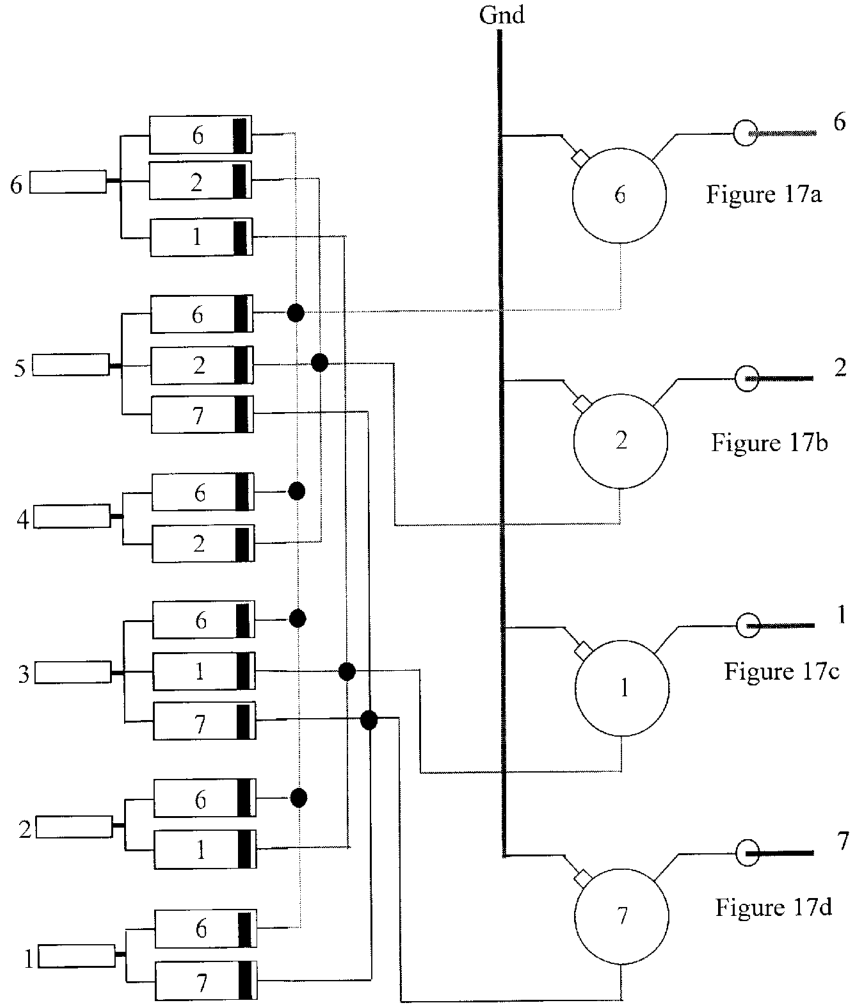

HDK-75 Key Decoder – Figure 18
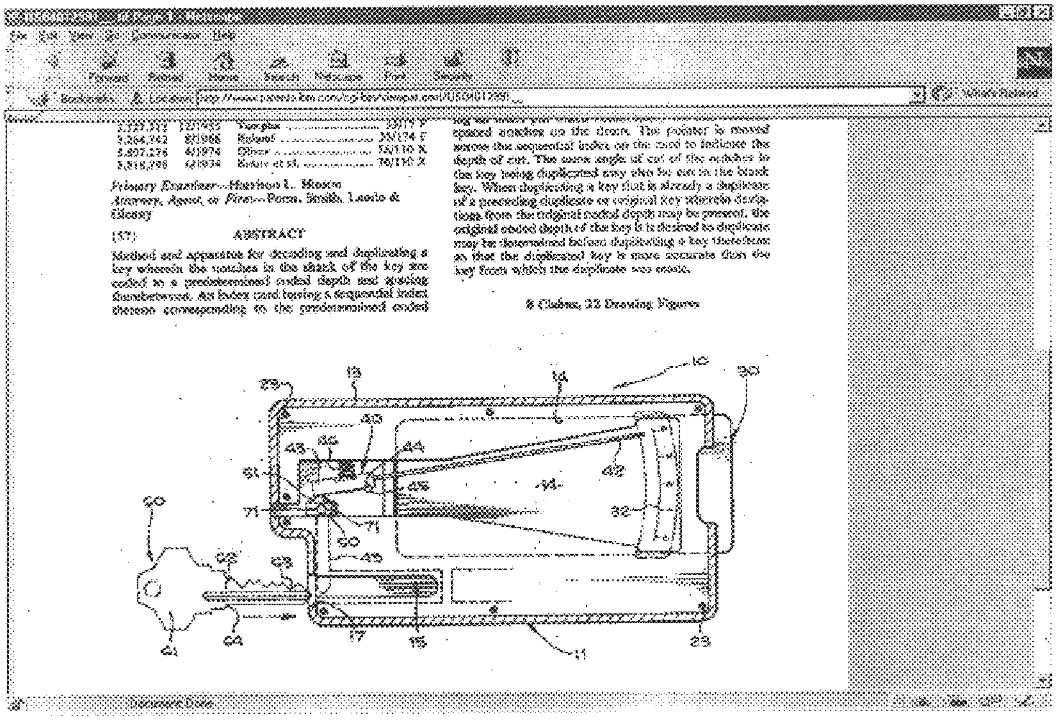
Key Decodes Gauge – Figure 19
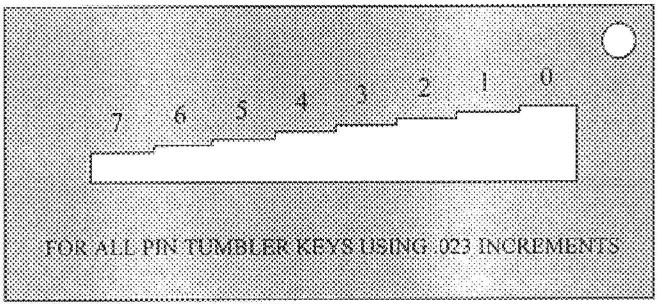

Key Decodes Gauge – Figure 19
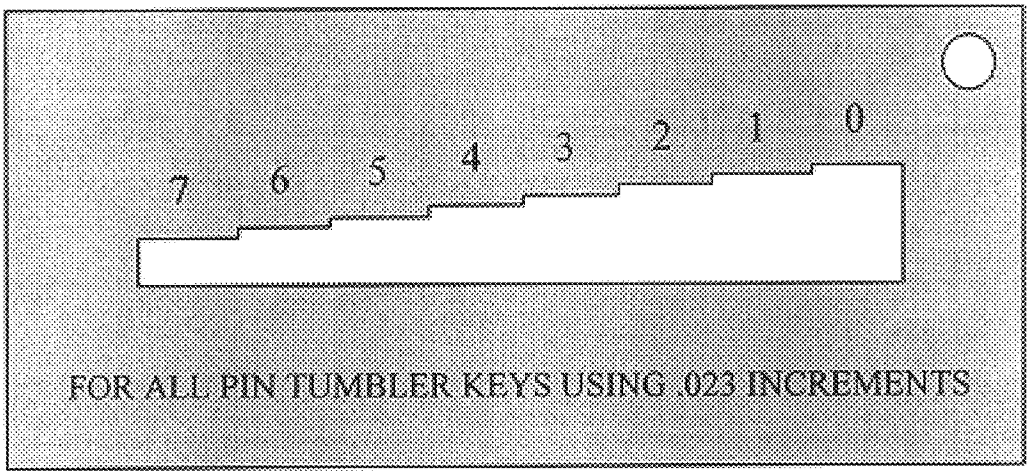
(Background Art)

DIGITAL KEY DECODER

I Clifford Eugene Wood (Locksmith and United States citizen) would like to introduce a new electronic device that will decode the grooves or notches in the shank of a key and display the complete code in digital format on the front faceplate of a hand-held, pocket-sized unit.

Digital—because the electrical internal components rely on a linear slide mechanism and digital circuitry to decode the grooves in the shank of a key that displays the complete code on the LED segment faceplate.

Key—because there is a need for Contractors and Locksmiths to use an up-to-date decoder that will visually display the complete code without re-gauging, losing or mixing up keys during the master or re-keying process.

Decoder—because this unit will instantaneously decode a key much faster than the present method of measuring each notch or groove independently.

The "Digital Key Decoder" will provide digital readout of the complete code from a predetermined manufactured key after inserted into the warded keyway. One-keyway prototype is available by request for your viewing.

BACKGROUND OF THE INVENTION

My Patent search was derived from:

I visited the Patent Search Room at Crystal Plaza 3, IA01, 2021 Jefferson Davis Highway on Dec. 2, 1999 and searched "All Databases (USPT+EPAB+JPAB)" for cross references under the following:

1. Display decoders—39 in database
2. Digital key—346 in database
3. Locksmith—364 in database
4. Key decoders—100 in database
5. Electronic decoders—9 in database
6. Digital key decoder—0 in database
7. Digital decoders—76 in database The following is the result of my findings from the field of search that may be related to my invention:

Automatic Key Identification System—4899391A—Feb. 6, 1990

Automatic Key Identification System—5127532—Jul. 7, 1992

Digital key system—4144523—Mar. 13, 1979

Digital electronic key and lock system—5691711—Nov. 25, 1997

Key decoder tool for use by locksmiths in determining the tumbler coding of locks—0391470—Mar. 3, 1998

The following is closer related to my invention:

Key Reading Method and Apparatus The "Key reading method and apparatus" is similar for decoding a key wherein the notches in the shank of the key are measured against a spring-biased movement. However, this unit does not display the complete electronic code of the key in an LED segment display on a faceplate.

Patent: U.S. Pat. No. 5,146,689
Issued: Sep. 15, 1992
Title: Key reading method and apparatus
Inventor(s): Roland; Max G., San Clemente, Calif.
Applicant(s): Maromatic Company, Inc., Mountain View, Calif.
Issued/Filed Dates: Sep. 15, 1992/Jan. 29, 1992 E1 (Expired)
Application Number: US1992000827766
IPC Class: G01B 011/24; G01D 005/32;
Class: Current: 033/539; Original: 033/539
Field of Search: 033/539 070/460,394

Key Decoding and Duplicating Apparatus and Method

The "Key decoding apparatus" uses a similar method for decoding a key wherein the notches in the shank of the key are coded to a predetermined coded depth. This unit does not display codes and intended for duplicating new keys (FIG. 18).

Patent: U.S. Pat. No. 4,012,991
Issued: Mar. 22, 1977
Title: Key decoding and duplicating apparatus and method
Inventor(s): Uyeda; Tim M., South San Gabriel, Calif.
Applicant(s): Gartner; Klaus W., La Palma, Calif. and La Gard, Inc., Torrance, Calif.
Issued/Filed Dates: Mar. 22, 1977/Jun. 2, 1975 and May 23, 1978/Apr. 22, 1976
Application Number: US1975000582639 and US1976000679169
IPC Class: B23C 001/16; B23F 023/08; B21K 013/00 and G01B 003/28; G01B 005/20;
Class:
Current: 409/081; 033/539; 076/110; 409/084;
Original: 090/013.05; 033/174.F; 076/110; and
Current: 033/539; 033/836; 409/081;
Original: 033/174.F; 033/172.E; 090/013.05
Field of Search: 090/13.05 076/110 033/174F 029/76 C and 033/174 F,172 E 090/13.05

This invention relates to Contractors and Locksmiths, specifically to speed-up the process of master and re-keying locks. I found two units that decode the shank in a key, but do not display the entire code instantaneously, verbal and/or in electronic format.

1. The first unit is manufactured by HPC. This KEY DECODER is a manual pocketsize decoder for determining the depths of the shank in a key. The user must insert the correct card into the upper slot, then insert a matching key into the slot at the bottom right. The unit (called "D CODE A KEY") will decode each notch in the shank of the key. Insert the key all the way in, a needle will register the depth of the shank in the key, and another needle will point to a number on the card above. This is the code for the first cut or groove in the key. Continue for each groove, until all are decoded for the final code reading. This unit will not measure in thousands of an inch and not intended for adjusting or setting up any key machine (see FIG. 18).
2. The second unit is a manual "Key Decoding Gauge". Many are manufactured in stainless steel and readily available. Kwikset, Schlage, Weiser, and Weslock are the most common in the Locksmith industry. This manual gauge works similar to the unit described above, but limited to the use of manually reading the key when it stops inside the slider gauge. Starting from the bow (part of key that is held) measure each groove by inserting the key into the gauge and slide the first groove until the key stops. The number above the key is the number of the code for that groove. Repeat this step for each groove until all are gauged. The combination of all measurements in sequential order, make up the code for the key (see FIG. 14*a* (bottom) and 19).

BRIEF SUMMARY OF THE INVENTION

This is a pocket sized electronic device that will decode and display a five-digit LED code from the shank of a pre-coded key. Primarily used for Contractors and Locksmiths, but not limited as such. Eliminates risk of forgetting key codes and having to re-gauge. Codes can be determined in minimal light (darkness). Greatly expedites work in any master and residential-keying jobs. Ends possibility of losing or mixing up keys by housing the key inside the unit.

OBJECTIVE

1. Speed-up re-keying time wasted on decoding keys the manual way.
2. Obtain key codes in total darkness.

ADVANTAGES

1. Easier/fun to use/Novelty item.
2. Instantly decodes a key when fully inserted into the proper keyway.
3. Quicker and easier to use than the manual slider gauge.
4. No external light needed at night to operate.
5. Expedites work in any or master-keying or construction jobs.
6. Call-in-a-code[1]
7. Talking 5-2-1-3-4! And Bargraph models too!
8. Covers a variety of manufacturers throughout the industry. Not limited to home and padlocks, but includes high security locks as well.
9. Many novel items available.
   Leather case, belt strap, wall adapter, printer interface, re-chargeable batteries, carrying case, handle, neck lanyard or belt hook, different color case and display colors, sizes, etc., easy to access locking battery compartment, interchangeable or multiple keyways to suit other manufacturers, memory—remembers all decoded keys and different color LED Plexiglas displays, permanent or snap in and out.

[1]Call-in-a-code—Duplicate additional keys when the original cannot be removed from the site or location—cut keys by code on a key machine away from site or location from a licensed Locksmith. Not to violate any law.

BRIEF DESCRIPTION OF THE SEVERAL VIEWS OF THE DRAWING

REFERENCE NUMBERS

Figure 1:
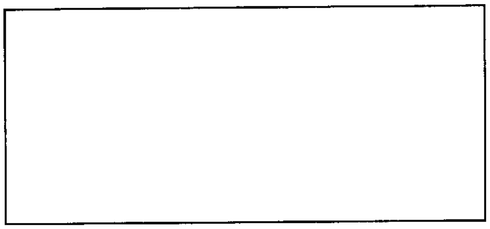
Figure 1A:
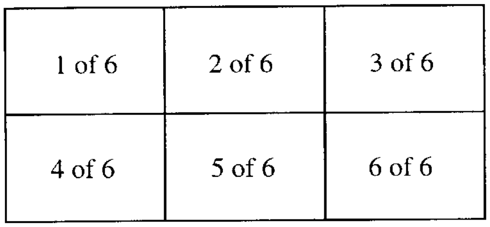

10 Faceplate mounting hole
12 Cylinder hole
14 Red-Plexiglas
16 Faceplate
18 Display window
20 Cylinder mounting hole
22 Light Switch hole
26 "Light" Logo
28 "Digital Key Decoder" Logo
30 Vector board (top)
32 CA3161E Integrated Circuit chip a, b, c, d, e
36 LN514RA Segment display a, b, c, d, e
38 Vector board (middle)
40 16-pin IC socket-wire wrap
42 Vector board (bottom)
44 Display Module Bus connector
50 Vector board (top)
52 Vector board Mounting hole
54 1N4148 Silicon diodes
56 2N2222A PNP Transistors
58 Vector board (middle)
60 Vector board (bottom)
62 Logic Board edge connector a, b, c, d, e
64 Logic Board Bus connector
70 Cylinder Assembly
72 Warded keyway
74 Cylinder faceplate
76 Switch Assembly mounting hole
78 Cylinder retaining clip
80 Cylinder core
82 Cylinder hull
84 Cylinder hull pin housing
86 Hull pin cylinder a, b, c, d, e
88 Cylinder shim
94 Rod
100 DPDT Toggle Switch
102 DPDT Toggle Switch Assembly
104 Light Bulb holder
106 1.5 volt Light Bulb
110 Toggle Switch Cam
112 Momentary push-button Switch
122 Switch Assembly mounting hole
124 Switch Arm
126 Calibration notch
128 Switch Arm Contact
130 Switch Arm Pivot Screw
134 Calibration Adjustment hole
136 Dual-Sided PC Board
138 Dual-sided PC Board-mounting hole
140 Cylinder hull cutout
144 Notch or Groove
146 Logic Board circuit etch
148 Switch Assembly edge connector a, b, c, d, e
150 Switch Assembly
152 Logic Board circuit etch cutout
156 Switch Assembly End Mount
158 Circuit board trace
160 Case Assembly
162 Faceplate Mount
164 1.5 volt Battery holder
166 6.0 volt Battery holder
168 1.5 volt Battery
170 6.0 volt Battery
200 ¼" Faceplate Mounting screw
202 2" Plexiglas, Display, Logic Mounting screw
204 ¼" Cylinder Assembly Mounting screw
206 ¼" shim for 202
208 Washer for 202
210 Nut for 202
212 ¼" Switch Assembly Mounting screw
214 ½" shim for 202
218 1" Switch Assembly Mounting Screw

FIGURE DEPICTIONS

FIG. 1—6"×8" Vector Board

FIG. 1*a*—6"×8" Vector Board (un-cut) sectioned off into six parts

Figure 1B:
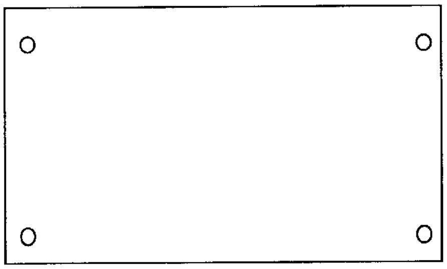

FIG. 1*b*—one section of the 6"×8" Vector Board with ¼" holes in each corner, top holes slightly offset downward. Quantity of four is used for the middle and bottom layers on the Display Module and Logic Board.

Figure 1C:
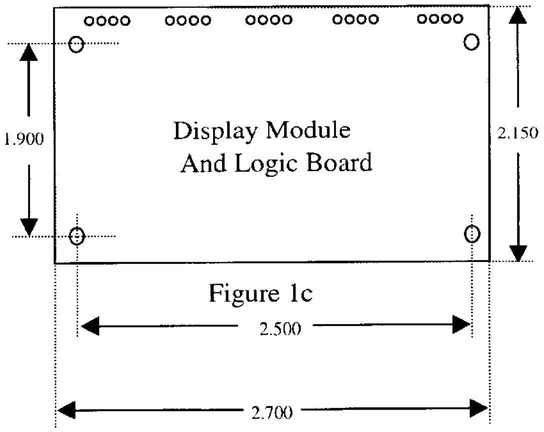

FIG. 1*c*—1 of 6 section pieces of the 6"×8" Vector Board with ¼" holes in each corner, top holes slightly offset downward. Display Module. Showing 20 holes at top for bus wire.

Figure 2:
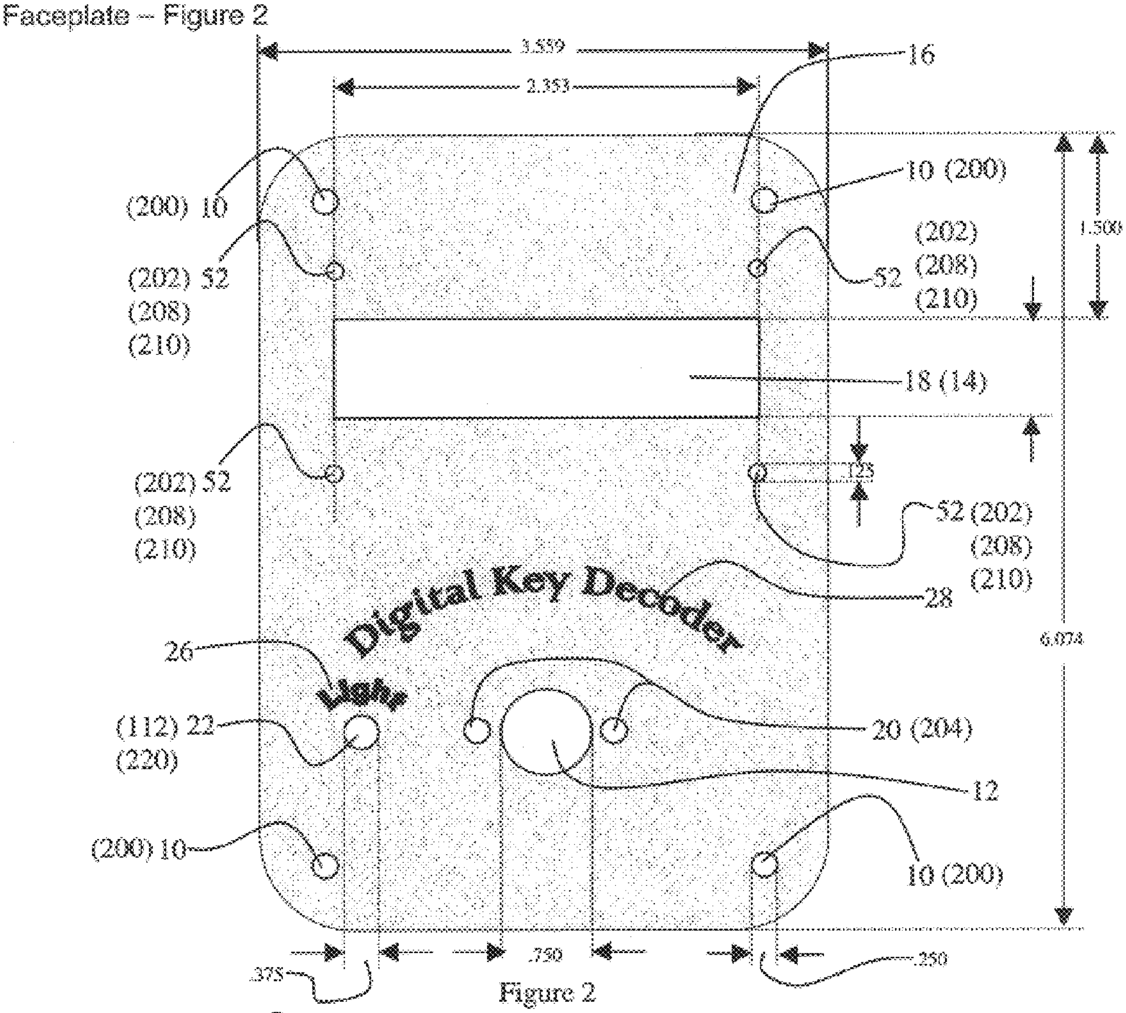

FIG. 2—All aluminum (6061-0) front Faceplate showing mounting holes. Also, Plexiglas, Display Module/Logic Board, display window, keyway push-button switch hole, Cylinder core, and Cylinder Assembly mounting holes. Mirror finish on faceplate surface with identification and light logos.

Figure 2A:
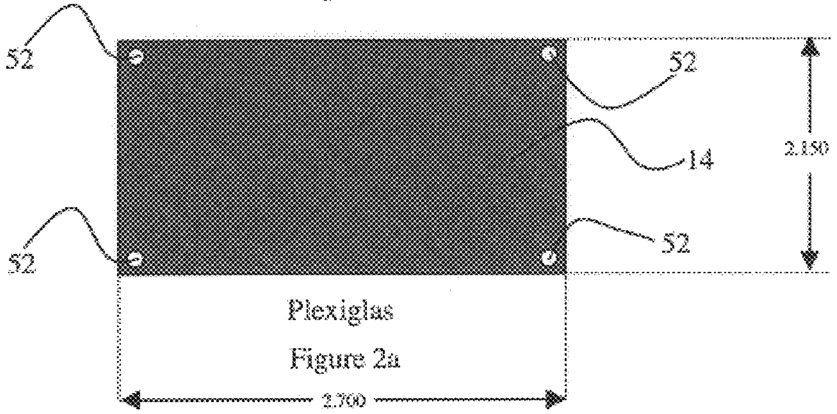

FIG. 2*a*—Red Plexiglas showing matching mounting holes to faceplate.

FIG. 3—Front View—Case Assembly—Outer case, preferably Aluminum. Drawing shows case with an imaginary faceplate installed. The case basically houses four batteries (1.5 & 6.0) and battery holders.

FIG. 3*a*—Bottom view looking through the case from the underside. View showing two AA batteries stacked on top and partial wiring.

FIG. 4—Top view looking down—Display Module—44*a–d* are imaginary holes. This is for the bus wires that connect all boards together.

FIG. 4*a*—Side view—looking in, shows ¼ shim (206) between vector boards and ½ shim (214) between top vector board and Plexiglas.

FIG. 5—Top view looking down—Logic Board—NOTE: proper orientation of components.

FIG. 5*a*—Side view—looking in, showing ¼ shim (206) between vector boards and ½ shim (214) separates top Logic Board from bottom Display Module.

FIG. 5*b*—Top view of Logic Board Bus Connector, basically this is the wire from the circuitry on the bottom-side and used as the edge connector to interface with the Switch Assembly for simplicity. Jumper wire is soldered directly from this wire to the Switch Assembly circuit (FIG. 14*b*).

FIG. 5*c*—Side view of the Logic Board Bus Connector. Shows the wires feeding through the board from the bottom to top.

FIG. 6—Front view looking in—Switch Assembly—first of five units.

FIG. 6*a*—Front view shows etch or trace pattern on backside for circuit #1 (FIG. 13)(158*a*). The traces (146) cannot touch each other and wired independently to the edge connector at the top (148*a*) to (62*a*). Circuit #2 is wired the same way, except to the next trace to the right of circuit #1 on the edge connector (148*b*) to (62*b*). These traces are jumper wired to the Logic Board in their perspective order (148*c*) to (62*c*), etc.

FIG. 6*b*—Top view Looking down shows the Cylinder Assembly (82) mounted in the Switch Assembly (150).

FIG. 6*c*—Exploited view of Logic Board circuit etches cutout (152), leaving etches for Switch Arm Contact (128) to touch (146).

FIG. 7—Top looking down—Cylinder Assembly—Kwikset.

FIG. 7*a*—Back view looking in—this view shows the built-in shims on the lock cylinder. All shims and the faceplate need to be removed to set-up this cylinder for my project.

FIG. 7*b*—shows same Cylinder Assembly with shims and faceplate removed.

FIG. 7*c*—shows Cylinder core outside of Cylinder hull.

FIG. 7*d*—rods (94) and Cylinder core retaining clip (78).

FIG. 8—Rear view—DPDT toggle switch mounted on the bracket. This bracket mounts against the rear of the Switch Assembly.

FIG. 8*a*—Top view—Toggle Switch Assembly—bracket and switch. Toggle Switch is activated when a key is inserted into the cylinder core. This turns on all circuits and the LED segment displays.

FIG. 9—Front view—Light Assembly—mounts on backside of Toggle Switch Assembly separated by shims (206).

FIG. 9*a*—Top looking down—shows light bulb in light bulb holder.

FIG. 10—Top view—looking down—Toggle Switch and Light Assembly with shims (206) between.

Figure 13:
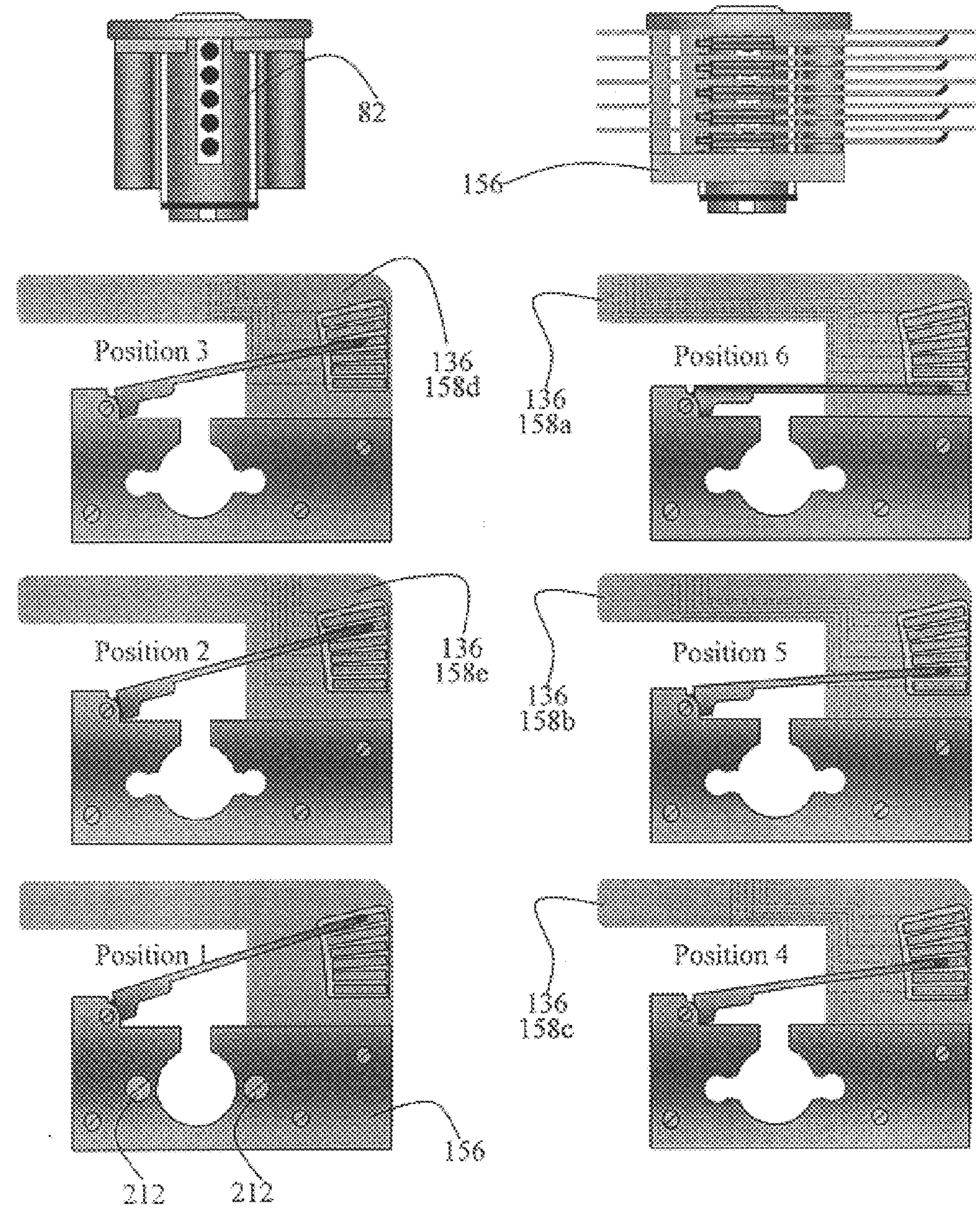

FIG. 11—Side view—Switch Arm Assembly—shows rod from cylinder core contacting Switch Arm. This rod raises the Switch Arm depending on the depth of the groove in the shank of the inserted key. The Switch Arm moves up and stops, thus making contact with the circuit board (FIG. 13).

FIG. 11*a*—Top view—one of five Switch Arm Assemblies. The Switch Arm was manufactured/modified from the spring-loaded temple pieces from a pair of quality glasses (FIG. 11*b*). The length was cut later to determine the linear position of the circuit with respect to the depth of the groove in the shank of the key (calibration).

FIG. 11*b*—Eyeglasses with temple piece removed. The inward bias temple pieces were a perfect match to fabricate this spring-loaded Switch Arm because no additional parts were required to make the arm retract toward the key.

FIG. 11*c*—Exploited view showing internal spring and eyelet for screw (124). Resting position is shown in FIG. 11*a* (124).

FIG. 11*d*—Shimmed block of aluminum has many sheets of thin aluminum pressed together that make up a solid block. This can be machined as ordinary blocks of aluminum/steel, and layers can be pealed off as required to fit many tolerances.

FIG. 12—Side view—Switch Arm End Mount (156). Used to secure five Switch Assemblies to the Cylinder Assembly, also to mount Toggle/Light Assemblies.

FIG. 13—Side view—Switch Arm Positions—Showing all six positions of movements.

FIG. 14—Front view—showing faceplate removed and Switch Arm in #3 position. Display Module moved aside for view of Logic Board beneath. Wiring from Switch Assembly to Logic Board. Battery wiring to Toggle Switch (not shown) and to Display Module and Logic Board.

FIG. 14*a*—Front view—complete unit with key code displayed in window. Pre-coded key below showing combination (144).

FIG. 15—Block diagram of "Digital Key Decoder" circuitry.

FIG. 16*a*—Wiring schematic on the bottom side of the top Display Module Board.

FIG. 16*b*—Wiring schematic on the bottom side of the middle Display Module Board (Bus wiring).

FIG. 16*c*—Wiring schematic on the bottom side of the bottom Display Module Board (Power wiring—Positive and negative only).

FIG. 17—Logic Board wiring from edge connector from Switch Assembly (input) to bus connector (output) to Display Module. All five circuits are identical on the Logic Board which provides the input to the Display Module LED segment displays.

FIG. 17*a*—Collector output bus #6—Shows the base of the transistor wired to diodes 1 through 6 coming from the edge connector from the Switch Assembly. The 1.5 volt from the batteries, conducts through the diodes and turns the transistor on. The output from the transistor is ground and causes #6 bus to become a logic zero to the Display Module.

FIG. 17*b*—Collector output bus #2—Shows the base of the transistor wired to diodes 4 through 6 coming from the edge connector from the Switch Assembly. The 1.5 volt from the batteries, conducts through the diodes and turns the transistor on. The output from the transistor is ground and causes #2 bus to become a logic zero to the Display Module.

FIG. 17*c*—Collector output bus #1—Shows the base of the transistor wired to diodes 2, 3, and 6 coming from the edge connector from the Switch Assembly. The 1.5 volt from the batteries, conducts through the diodes and turns the transistor on. The output from the transistor is ground and causes #1 bus to become a logic zero to the Display Module.

FIG. 17*d*—Collector output bus #7—Shows the base of the transistor wired to diodes 1, 3, and 5 coming from the edge connector from the Switch Assembly. The 1.5 volt from the batteries, conducts through the diodes and turns the transistor on. The output from the transistor is ground and causes #7 bus to become a logic zero to the Display Module.

FIG. 18—HDK-75 Key Decoder

FIG. 19—Key Decoding Gauge

10—Faceplate mounting hole—These four holes secure the faceplate to the case and seal the entire unit.

12—Cylinder hole—This hole allows access to the cylinder plug for decoding a key.

14—Red-Plexiglas—Colored plastic (red)—used for the display window.

16—Faceplate—Used to secure Display, Logic and Cylinder Assembly and to keep the elements out of the unit.

18—Display Window—Viewing the entire LED code from a decoded key.

20—Cylinder Mounting hole—These two holes secure the Cylinder Assembly to the faceplate.

22—Light Switch hole—The push-button momentary switch feeds through the faceplate and secured to the faceplate with a nut.

26—"Light" Logo—Identification

28—"Digital Key Decoder" Logo—Identification

30—Vector Board (top)—One of three on the Display Module. Houses the 16-pin sockets, Integrated Circuits and segment displays.

32—CA3161E Integrated Circuit chip a, b, c, d, e—Static sensitive electronic components.

36—LN514RA Segment display a, b, c, d, e—Display individual code from each notch in the shank of the key.

38—Vector Board (middle)—Separates wiring from first level on the Display Module.

40—16-pin IC socket—wire wrap—Sockets were used to eliminate heat or static damage on the Integrated Circuit Chips and help during the wiring process.

42—Vector Board (bottom)—Again separates wiring from the second level on the Display Module.

44—Display Module Bus connector—Used to connect the circuitry from the Logic Board to the Display Module with a straight bus wire.

50—Vector Board (top)—One of three on the Logic Board. Houses five separate circuits of transistors and diodes.

52—Vector board Mounting hole—These holes are aligned up with the holes on the faceplate, which is used for securing the Logic Board with the Display Module boards.

54—1N4148 Silicon Diodes—7 volt silicon diode. Sets Logic truth table to determine what number to display on an LED segment.

56—2N2222A PNP Transistors—Sets zero logic if the circuit is selected, part of determining what number is displayed.

58—Vector board (middle)—Separates wiring from top board.

60—Vector board (bottom)—Separates wiring from middle board.

62—Logic Board edge connector a, b, c, d, e—connects to Switch Assembly by jumper wiring.

64—Logic Board Bus connector—Connects the circuitry from the Logic Board to the Display Module with a straight bus wire.

72—Warded keyway—Permit only the proper key to enter the keyway for correct decoding.

74—Cylinder faceplate—Used to mount the Cylinder Assembly to the faceplate.

76—Switch Assembly mounting hole—Used for mounting the Switch Assembly.

78—Cylinder retaining clip—secures the Cylinder Core in the Cylinder hull.

80—Cylinder core—Where the decoded key is inserted and rotated.

82—Cylinder hull—The base unit or backside of the Cylinder Assembly, where the Switch Arms join onto this assembly.

84—Cylinder hull pin housing—each cylinder contains a rod (94). Determines the depth of the shank for that location

86—Hull pin cylinders a, b, c, d, e—each Hull pin cylinder encases bottom, master and top pins and connects directly to the Switch Arm. Each cylinder is connected to a Switch Arm, which measures the depth in the shank of a key for each location.

88—Cylinder shim—This portion of the cylinder needs to be removed for addition of the Switch Assembly. Otherwise will interfere with the alignment of each Switch Arm with the top pins of each cylinder.

90—Two holes are exposed after the faceplate is removed. Used for mounting the Cylinder Assembly to the Front Faceplate.

94—Rod—makes contact with the Switch Arm and raises/lowers, depending on the pin location below.

100—DPDT Toggle Switch—turns on Segment Displays when key is inserted. Eliminates unnecessary battery drain. Turns off display when key is released.

102—DPDT Toggle Switch Assembly—This assembly is designed to mount the momentary DPDT toggle switch inside the cylinder core groove (FIG. 7*c*)(110).

104—Light Bulb holder—Lights the cylinder core when outside lighting is minimal or not present by pressing the "Light" (112) button on the faceplate.

106—Clear LED—connected through the faceplate switch and to the battery. Illuminates the backside of the cylinder core and shines through the front so the keyway is in view when outside/inside light is minimal or not present.

110—Toggle Switch Cam connects to the Cylinder core and turns on the toggle switch when the Cylinder core is rotated.

112—Momentary push-button switch—normally open, closes when pressed and illuminates internal keyway light bulb (FIG. 9)(106).

122—Switch Assembly mounting hole—These holes contain the Switch Assembly together as an entire unit. Two screws are fed through and bolted on the reverse side.

124—Switch Arm—Internally spring loaded to remain in the down position. The Switch Arm is raised/lowered by the top pins in each cylinder. The Switch Arm contacts the Logic Board etch and selects the circuit to activate on the logic board.

126—Calibration notch—This notch is used to move the Dual-Sided PC Board, up or down for calibrating purposes.

128—Switch Arm Contact—Connects the Switch Arm and the Logic Board circuit etch. Only one can contact at a time.

130—Switch Arm Pivot Screw—Fastens the Switch Arm (moveable) to the Switch Arm Assembly (stationary).

134—Calibration Adjustment hole—Tightens the Dual-Sided PC Board with the Switch Assembly after calibration.

136—Dual-Sided PC Board—Total of five boards. Used for measuring the position of the Switch Arm and converting the depths into an analog signal. Etched on the backside and each one is unique from the other. Board one to circuit one, board two to circuit two, etc.

138—Dual-Sided PC Board—mounting hole—connects the Dual-Sided PC Board to the Switch Assembly.

140—Cylinder hull cutout—A cutout in the Switch Assembly so that the Cylinder Assembly can mount inside the Switch Assembly and position the Switch Arms above each Hull pin cylinder, which measures the depth in the shank of the key.

144—Notch or Groove—Measured depths in the shank of a key.

146—Logic Board circuit etch cutout—Measured in increments of 0.023" between. Selects the circuit on the logic board to activate by the position contact of the Switch Arm/Switch Arm Contact.

148—Switch Assembly edge connector a, b, c, d, e—Aligned against the edge connector from the Logic Board. This is used to simplify wiring.

150—Switch Assembly—Entire unit as a whole. All five Switch Arms are combined to make up one unit.

152—Logic Board circuit etch cutout—This portion was etched from the front of the Dual-Sided circuit board to insulate each Logic Board circuit etch cutout from each other.

156—Switch Assembly End Mount—Basically an end cap to the Switch Arm Assemblies and to mount the Toggle Switch and Light Assemblies.

158—Circuit board trace—On the backside of (136)(FIG. 13). Each Board is etched differently, depending on location. Board 158*a* is positioned closest to the faceplate and indicates the first segment or digit in the code on the faceplate. Board 158*b* is positioned behind the first board and indicates the second segment or digit in the code on the faceplate. Board 158*c* is positioned next to the second segment or digit in the code on the faceplate, etc. Notice each Switch Assembly edge connector is wired differently on each Dual-Sided PC Board.

160—Case Assembly—Outer housing, weather proof and preferably aluminum.

162—Faceplate Mount—Secures the faceplate to the Case Assembly by mounting screws through the faceplate.

164—1.5 volt Battery holder—Quantity of two (2).

166—6.0 volt Battery holder—Quantity of two (2).

168—1.5 volt Battery (AA)—Used to bias the Logic Circuit diodes, transistors and keyway light.

170—6.0 volt Battery (Camera)—Used to turn on LED display.

200—¼" Faceplate Mounting screw—Hardware for faceplate—mounting

202—2" Plexiglas, Display, Logic Mounting screw—Long screw—feeds through all three Display Module and Logic Boards.

204—¼" Cylinder Assembly Mounting screw—Hardware

206—¼" shim—Or shim used to space between Display Module and Logic Boards layers.

208—Washer—Hardware

210—Nut—Hardware

212—¼" Switch Assembly Mounting screw—Hardware

214—½" shim

218—1" Switch Assembly Mounting screw—Used to secure Switch Assembly together as one unit.

220—Light Switch nut—Secures Light pushbutton switch on faceplate

DETAILED DESCRIPTION OF THE INVENTION

The Radio Shack's project kit number 270–627 was used as the Case Assembly. A Kwikset Double-Deadbolt lock (inner half), various electronic components, and manufactured hardware were also used to build this invention. I used Radio Shack components for the availability of parts and location.

Faceplate

The faceplate supplied from the Radio Shack kit was too thin to cut and fasten mounting hardware. I used a 12"×12" sheet of Aluminum (6061-0 gauge) (0.060) as stock for the faceplate of this unit.

Use the original Radio Shack faceplate as a template to cut out a 3.559"×6.074" rectangle (FIG. 1). Mounting holes were marked onto the new faceplate by placing the original faceplate on top of the blank sheet and scratching a hole mark at each of the four locations and tracing around the outer edges. Cut out and drill, eighth-inch holes (0.125") at each outer locations (3.00"×5.582"). 6–32"-phillips screws were used to secure the faceplate onto the plastic housing. Faceplate—long edges facing up, measure 1.500" down from the top and cut a 2.353"×0.637" rectangular hole and drill a 0.750" hole, 2.500" in the center from the bottom with two pilot holes (0.125") at the 3 and 9 o'clock positions (0.500"×0.500") apart from the center of the three-quarter inch hole. I used steel wool and Emory cloth to bring the faceplate to a respectable shine.

Trim off a 3.125"×1.350" piece of red Plexiglas and center it across the back window of the faceplate. Mark each corner relative to the faceplate holes (FIG. 2). Drill a (0.125") hole at each corner (FIG. 2*a*) and apply it to the back-bottom of the faceplate through the rectangular opening—making up the display window.

Display Module

Use a 6.000"x8.000" vector board (0.100×0.100) for the Display Module and Logic Board (FIG. 1). Cut six (6) 2.750"×2.325" pieces of vector board and drill a 0.125" hole at each corner, allowing enough room for mounting hardware (FIG. 1*c*). Remove burrs with a razor blade or fine 1" file. Set one aside for later use. Use other four (4) to separate layers for wiring this board and the Logic Board.

Lay a vector board down (30)—lengthwise. Mount five LED Displays (LN514RA) evenly spaced across the center of the board, not to exceed 2.425" (each display should almost be touching). Install three evenly spaced and orientated 16-pin IC sockets across the top, and two evenly-spaced and orientated across the bottom as well (FIG. 4). With LED Displays and IC sockets on the board, lift vector board and gently bend several leads on bottom side to prevent components from falling out. IMPORTANT: Orientation must be correct! Flip the board over and wire/solder per "Top" (FIG. 16*a*). Install another vector board (38) and line up components that fed through first board (FIG. 4*a*). Insert a shim (206) at each corner and press down until all edges are flush. Wire/solder per "Middle" (FIG. 16*b*). Install another vector board (42) and line up components that fed through second board. Insert a shim (206) at each corner and press down until all edges are flush. Wire/solder per "Bottom" diagrams (FIG. 16*c*). Cut off excess length on component leads and check for solder bridges. Install 4" Bus wire on the top side of the board from each IC (FIG. 4)(44*a, b, c, d, e*), bus wire should connect all three boards together and should be long enough to penetrate all three Logic Boards, that will connect on the bottom at a later time. Display Module should be a 3-layered board. Do not install IC's at this time and refrain from touching Display Module until ready to test.

Logic Board

Obtain a new vector board (FIG. 1*c*)(50). Mount diodes (1N4148) and transistors (2N2222A) as per (FIG. 5.). Install components for all five circuits. Follow same pattern for mounting and bending component leads as Display Module. IMPORTANT: Orientation must be correct! Flip the board over and wire/solder per "Top" on the underside all five circuits per Logic Board Bus Connector, circuit #6 (FIG. 17*a*). Install another vector board (58) and line up components that fed through first board (FIG. 5*a*). Insert a shim (206) at each corner and press down until all edges are flush. Wire/solder per "Middle" on the underside all five circuits per Logic Board Bus Connector, circuit #2 (FIG. 17*b*). Install another vector board (60) and line up components that fed through first board (FIG. 5*a*). Insert a shim (206) at each corner and press down until all edges are flush. Wire/solder per "Bottom" on the underside all five circuits per Logic Board Bus Connector, circuit #1 (FIG. 17*c*). Wire/solder per "Bottom" on the underside all the remaining five circuits per Logic Board Bus Connector, circuit #7 (FIG. 17*d*). Route the bus wires from the Display Module through all three Logic Boards and solder every connection. Trim off excess bus wire from bottom of Logic Board and Display Module. Wiring from Logic Board Edge Connector is the combination of all six circuits wired in the sequence above. The wires are fed through the existing holes to simplify the construction and alignment from the Logic Board to the Switch Assembly (FIG. 5*c* and FIG. 5*d*).

Cylinder Assembly

Use a Kwikset Double-Deadbolt inside half for the Cylinder Assembly. I could have used any other for this application. However, I found Kwikset is the most common and easiest to use at this time. The only modification done to the cylinder was removing the face-cap which exposed the screw holes at the 3 and 9 o'clock positions and grinding-flush a portion on the backside (10–11 & 1–2 o'clock positions) of the cylinder faceplate for clearance purposes (FIG. 7*a*)(88) and (FIG. 7*b*).

Switch Assembly

I used the Radio Shack, Dual-Sided PC Board (276-1499) as the circuitry for the "Switch Assembly". I consider the Switch Assembly as the heart and soul of my invention (FIG. 11*c*).

1. I fabricated the Switch Arm from the temple piece of a pair of glasses (FIG. 11*b*). I used this for the Switch Arm because of the built-in spring mechanism inside and the simplicity of fabricating a base to house the unit (FIG. 11*a*).
2. The Switch Base was fabricated from a block of shimmed aluminum[2] (FIG. 11*d*). I machined this to fit around the Cylinder Assembly (FIG. 6) and (FIG. 11).
3. Screw on Switch Arm (FIG. 6)(124)(130).
4. Cut out five 2.000"×3.000" pieces out of the Dual-Sided PC Board.
5. Etch out the dimensions shown in (FIG. 6*a* and FIG. 6*c*) for all five Dual-Sided PC Boards.
6. Line up and Drill two holes shown in (FIG. 6*a*)(126)(138) to match Switch Assembly (150)(122)(134) for all five Dual-Sided PC Boards.
7. Mount PC Boards onto Switch Base using two screws (FIG. 6*b*)(156)(FIG. 12).
8. Mount Switch Bases together and secure with mounting screws. Switch Assembly should be complete (FIG. 6*b*) and each Switch Arm should be in the down position (FIG. 13)(Position 6).

1. Insert calibration key #6 into cylinder and adjust PC Board bottom center contact against Switch Arm for all five circuits. Insert calibration key #1 into cylinder and adjust PC Board bottom center contact against Switch Arm for all five circuits. Secure with screw, washer and nut from miscellaneous hardware.
2. Apply the 6-volt battery to the Display Module and a 1.5-volt battery to the Switch Assembly. Separate power supplies were used because the BCD IC's (CA3161E) require a higher voltage to drive the segments displays. While the diodes on the Logic Board from the Switch Assembly requires only 0.7 volts to turn on the silicon diodes. The Display Module requires a ground on the base of the transistors from the Logic Board to control the different numbers on the Display Module segments. Both circuits are routed through the DPDT Toggle Switch Assembly.

Calibration—All digits should be reading "6". Insert calibration key #1, all digits should read "1". Repeat for remaining calibration keys #2,3,4.

[2]Shimmed aluminum—Similar to pressed tin foil. Portions can be pealed away to fit any application.

An explanation of how the invention works or operates

NOTE: A key is read with bow[3] on left, notches pointed up. Read notches from left to right.

1. Insert a five notch[4] compatible key completely into the warded[5] keyway. Simultaneously, five top-pin tumblers[6] raise five Switch Arms in the cylinder hull[7]. These Switch Arms[8] touch Switch Arm Contacts[9] that determine the depth of each notch (the Switch Arm is designed to touch one Switch Arm Contact at a time). If the first groove in the key is cut to a depth of "5", the top pin from the cylinder hull will raise the Switch Arm one position. This brings ground potential to the base of the (first circuit) transistor on the Logic Board[10], causing the BCD to trigger the circuitry to display a number "5" in the first location on the Display Module[11] (left digit is the number one position). If the second groove in the key is cut to a depth of "2", the top pin from the cylinder hull will raise the Switch Arm four positions. This brings ground potential to the base of the (second circuit) transistor on the Logic Board, causing the BCD to trigger the circuitry to display a number "2" in the second location on the Display Module. If the third groove in the key is cut to a depth of "1", the top pin from the cylinder hull will raise the Switch Arm five positions. This brings ground potential to the base of the (third circuit) transistor on the Logic Board, causing the BCD to trigger the circuitry to display a number "1" in the third location on the Display Module. If the fourth groove in the key is cut to a depth of "3", the top pin from the cylinder hull will raise the Switch Arm three positions. This brings ground potential to the base of the (fourth circuit) transistor on the Logic Board, causing the BCD to trigger the circuitry to display a number "3" in the fourth location on the Display Module. If the last groove in the key is cut to a depth of "4", the top pin from the cylinder hull will raise the Switch Arm two positions. This brings ground potential to the base of the (last circuit) transistor on the Logic Board, causing the BCD to trigger the circuitry to display a number "4" in the last location on the Display Module.

2. Simply push in the key. This will activate an internal momentary toggle switch[12], which will apply 6.0 volts (from the battery) that will illuminate the correlating numbers on each display segment for the total code of the key, in this case 5-2-1-3-4, through the Plexiglas on the faceplate.
3. Release the key and the display will turn off. Key remains inside the unit until withdrawn.

[3]Bow—part of the key that is held when inserting into a lock.
[4]Notch—grooves in the shank of a key.
[5]Warded or wards—Protrusions on the side of the keyway are called wards. Wards restrict the set of keys that can be inserted into the plug.
[6]top-pin tumblers—upper most pin in the cylinder hull of each cylinder
[7]cylinder hull—Lock assembly
[8]Switch Arms—measurement device that determines notch depth in the shank of a key.
[9]Switch Arm Contacts—measurement circuit board that determines display number.
[10]Logic Board—Decodes from analog to digital.
[11]Display Module—Binary-Coded-Decimal display on faceplate.
[12]Momentary toggle switch—a spring-loaded switch that closes contacts when energized opens when de-energized.

I Clifford Eugene Wood claim my invention is:

1. A device for measuring key codes and combinations comprising:

a warded keyway;

a double-pole double-throw toggle switch;

a plurality of switch arms configured to determine levels by a depth of a plurality of successive grooves in a shank of said key to provide a measurement of said successive grooves; and a display module including a plurality of display elements configured to display at least one of a code and combination of said key on at least five display elements simultaneously, wherein, said toggle switch is configured to supply battery power to a plurality of the display elements and to a plurality of logic diode circuits, and said plurality of switch arms are configured to bias a plurality of rods against said successive grooves with a bias spring internal to each of said plurality of switch arms.

2. The device for measuring key codes and combinations of claim 1, further including a voice circuit configured to provide audible output through a mini speaker.

3. The device for measuring key codes and combinations of claim 1, further including a momentary push-button switch configured to turn on a light that illuminates said warded keyway.

4. A method for measuring key codes comprising the steps of:

inserting a key into a warded keyway;

positioning a plurality of switch arms to levels determined by a depth of a plurality of successive grooves in a shank of said key to provide a measurement of said plurality of successive grooves;

rotating said key to simultaneously engage a double-pole double-throw toggle switch and turn on a plurality of display elements; and displaying at least one of a code and combination of said key on at least five display elements simultaneously, wherein, said toggle switch is configured to supply battery power to a plurality of said display elements and to a plurality of logic diode circuits, and said plurality of switch arms are configured to bias a plurality of rods against said plurality of successive grooves with a bias spring internal to each of said plurality of switch arms.

* * * * *